United States Patent [19]

Vogel

[11] Patent Number: 5,454,994
[45] Date of Patent: Oct. 3, 1995

[54] PROCESS FOR THE PRODUCTION OF MOLDED PARTS AND FILLINGS MADE OF RIGID AND FLEXIBLE POLYURETHANE FOAMS USING DIFFERENTIAL ACTIVATOR CONCENTRATIONS

[75] Inventor: Christoph Vogel, Odenthal, Germany

[73] Assignee: Bayer Aktiengesellschaft, Leverkusen, Germany

[21] Appl. No.: 265,991

[22] Filed: Jun. 27, 1994

[30] Foreign Application Priority Data

Jul. 9, 1993 [DE] Germany ............ 43 22 887.9

[51] Int. Cl.[6] .................................. B29C 44/02
[52] U.S. Cl. ............ 264/51; 264/53; 264/328.6
[58] Field of Search ............ 264/51, 347, 328.6, 264/53

[56] References Cited

U.S. PATENT DOCUMENTS

| | | | |
|---|---|---|---|
| 4,314,963 | 2/1982 | Boden et al. | 264/39 |
| 4,379,100 | 4/1983 | Salisbury et al. | 264/39 |
| 4,435,349 | 3/1984 | Dominquez et al. | 264/257 |
| 4,710,521 | 12/1987 | Soukup et al. | 264/53 |
| 4,742,128 | 5/1988 | Frisch et al. | 525/424 |
| 4,919,878 | 4/1990 | Pilger et al. | 264/328.6 |
| 5,238,973 | 8/1993 | Mayer et al. | 264/328.6 |
| 5,300,560 | 4/1994 | Harasin et al. | 264/328.6 |

FOREIGN PATENT DOCUMENTS 2-8026   1/1990   Japan ............ 264/51

*Primary Examiner*—Allan R. Kuhns
*Attorney, Agent, or Firm*—Joseph C. Gil; Lyndanne M. Whalen

[57] ABSTRACT

Molded parts and fillings of rigid and flexible polyurethane foams and rigid polyurethane foams with isocyanurate structures are made from a polyol and isocyanate in the presence of an activator, water, a blowing agent and optionally other additives. Imperfections in the foam are avoided by raising the amount of activator with time during the production of the reaction mixture in such a way that the friability time occurs simultaneously throughout the contents of the mold.

12 Claims, No Drawings

PROCESS FOR THE PRODUCTION OF MOLDED PARTS AND FILLINGS MADE OF RIGID AND FLEXIBLE POLYURETHANE FOAMS USING DIFFERENTIAL ACTIVATOR CONCENTRATIONS

BACKGROUND OF THE INVENTION

The present invention relates to a process for the production of molded parts and fillings made of rigid and flexible polyurethane foams and rigid polyurethane foams with isocyanurate structures.

In processes for the manufacture of molded parts, filling mold cavities, and discontinuous panel production from foam-forming mixtures, the output rate of the foam machines is generally kept high enough that the required amount of reaction mixture is charged in the shortest possible time. This is done to achieve the narrowest possible age spectrum of the reaction mixture so that the curing process will start simultaneously throughout the mold.

If relatively large parts are to be produced in molds or large cavities are to be filled with foam or panels are to be produced discontinuously, fairly long pouring times are necessary unless the filling is carried out in several shots. In either case, the age spectrum of the finished foam broadens. Variations in the gross density of the finished foam and anisotropy of the cell structure occur due to the running-under or rolling-over of the foaming reaction mixture. There is also a lack of dimensional stability in the disturbed zones of the foam.

The problem of eliminating or compensating for losses of quality due to an extended age spectrum of the reaction mixture is addressed by the present invention.

SUMMARY OF THE INVENTION

It is an object of the present invention to provide a process for producing molded polyurethane foams having improved dimensional stability.

It is also an object of the present invention to provide a process for producing molded polyurethanes having uniform density and cell structure.

These and other objects which will be apparent to those skilled in the art are accomplished by charging the activator to the foam-forming reaction mixture in the mixing chamber or to the polyol shortly upstream of the mixing chamber in an amount which increases with time in such a way that the friability (curing, hardening) occurs as far as possible simultaneously throughout the mold into which the foam-forming mixture is fed.

DETAILED DESCRIPTION OF THE INVENTION

The present invention relates to a process for the production of rigid or flexible polyurethane foams or polyurethane foams containing isocyanurate structures in a mold to form molded parts or fillings. In this process, a polyisocyanate is combined with a compound containing at least two hydrogen atoms which are reactive with isocyanate groups, an activator, and optionally water or other blowing agent in a mixing chamber to produce a foam-forming mixture. Activator may be directly added to the foam forming mixture or to one of the other components (preferably the compound containing at least two hydrogen atoms which are reactive with isocyanate groups) prior to addition of that component to the foam-forming mixture so that the relative amount of activator present in the mixture increases as the foam-forming mixture is fed to the mold. The foam-forming mixture is fed to the mold, either in one or several stages. The foam is allowed to rise in the mold and then removed from the mold.

The result achieved by this process is that the age of the reaction mixture charged later is compensated by a shorter friability time. Several variants of the new process are available. The preferred variant will depend upon production requirements.

In a first variant, the reaction mixture is produced in one shot. In addition, the amount of activator, considered over the duration of the shot, is steadily increased.

In a second variant, the reaction mixture is produced in several shots, the proportion of activator being increased from shot to shot. This method is particularly useful when fairly large cavities have to be filled with foam-forming mixture. In this embodiment of the present invention, it is preferred that the individual shots be short and occur in rapid succession.

In a third embodiment of the present invention, the reaction mixture is produced in several shots and the relative proportion of activator is increased from shot to shot with the relative increase being additionally raised during at least one shot. The relative proportion of activator may also be raised during each shot.

The process of the present invention is particularly useful when very large cavities of complicated shape have to be filled, the setting-up of the individual shots requires more time, and the shots or individual shots are lengthy.

The process of the present invention causes no mechanical engineering difficulties whatever. The delivery rate of the available activator pump can be varied during operation. More advantageously, a second activator pump with controllable delivery rate is used. The use of a second pump is particularly advantageous because the accuracy of addition of small amounts of activator will be greater.

The addition of the amount of activator is preferably controlled by computer. Computer controlled addition of the activator makes it possible to increase the amount of activator necessary to conform with specified time requirements.

Any of the known polyisocyanates (Component A), compounds containing at least two active hydrogen atoms (Component B), and blowing agents which are useful to produce a polyurethane may be used in the process of the present invention. Activators or catalysts known to catalyze the reaction of isocyanates with isocyanate-reactive materials may be used in the process of the present invention. Activators which strongly catalyze the reaction are preferred. Any of the additives and auxiliaries typically used in producing polyurethane foams may also be included in the foam-forming mixture of the present invention. Examples of suitable auxiliaries and additives include foam stabilizers and flameproofing agents.

Particularly preferred polyisocyanates include polymeric diphenylmethane diisocyanate (MDI) with a monomer content of from 25 to 70 wt % and polyurethane-modified polymeric diphenylmethane diisocyanate with a monomer content of from 35 to 70 wt % of monomeric diphenylmethane diisocyanate.

Preferred compounds containing at least two isocyanate-reactive hydrogen atoms are polyether polyols, having a molecular weight of from 400 to 10,000.

Preferred activators are tertiary amine compounds generally known in the art, such as 1.4-diaza-(2.2.2)-bicyclooctane (DABCO).

Mixtures of activating compounds that strongly accelerate the reaction of the preferred polyisocyanates with the compounds containing hydroxyl groups are most preferably used as activators.

Having thus described my invention, the following Examples are given as being illustrative thereof. All parts and percentages given in these Examples are parts by weight or percentages by weight, unless otherwise indicated.

EXAMPLES

Example 1 (Comparative)

The following work was carried out during the production by means of lance-drawing technology of a composite unit of a foam core with covering layers using the following components A and B:

Component A was a mixture of:

| | |
|---|---|
| 40 parts by weight | of an ester polyol having an OH number of 370, produced by reaction of trimethylolpropane with phthalic acid, adipic acid and oleic acid |
| 30 parts by weight | of a polyester having an OH number of 385, produced by reaction of trimethylolpropane with propylene oxide |
| 30 parts by weight | of a polyester having an OH number of 550, produced by reaction of trimethylolpropane with propylene oxide |
| 1.2 parts by weight | of a polyether-modified siloxane foam stabilizer which is commercially available under the designation B 1048 from the Goldschmidt Company, Essen, FRG |
| 1.5 parts by weight | of water |
| 0.325 parts by weight | of a formulation of tertiary amines as catalyst which is commercially available under the name Desmorapid PP from Rhein-Chemie Rheinau, Mannheim, FRG |
| 0.325 parts by weight | of an aliphatic tertiary amine catalyst which is commercially available under the name Desmorapid PV from Rhein-Chemie Rheinau, Mannheim, FRG, and |
| 40 parts by weight | of the monofluorotrichloromethane which is commercially available under the name Frigen 11 from Hoechst AG, Frankfurt/Main, FRG |

Component B:

| | |
|---|---|
| 150 parts by weight | of polymeric MDI with an NCO-content of 31.5 wt % which is commercially available under the name Desmodur 44V20 from Bayer AG, Leverkusen, FRG. |

Components A and B were mixed with a high-pressure nozzle atomization machine (Type HK 270 Machinenfabrik Hennecke GmbH, St. Augustin, FRG). A composite unit of gross density 45 kg/m³ with dimensions 6×1×0.05 m was produced by introducing a lance carrying the discharge nozzle for the reaction mixture into the space between two suitably fixed cover sheets, and backwardly drawing the lance at a rate the space is filled with reaction mixture (lance drawing technology). The discharge rate of the machine was about 450 g/second. The casting time was about 30 seconds. The amount of reaction mixture charged was 13.5 kg. The reaction data of the foam mixture were:

Cream time: 18 seconds

Friability time: 100 seconds

Gross density: 23 kg/m³ (freely foamed)

The Gross density distribution in the composite unit was:

start of panel: 32 to 35 kg/m³ (start of shot)

middle of panel: 40 to 45 kg/m³ end of panel: 50 to 55 kg/m³ (end of shot)

Example 2

Components A and B described in Example 1 were combined in the same amounts as were used in Example 1. An activator mixture made up of the catalysts which are commercially available under the names Desmorapid PV/Desmorapid PP (1:1 parts by weight) was charged to component A on the polyol side via a calibration block over an injection time of 30 seconds in increasing amounts of from 0 to 0.145 g per 140 g of component A.

The increasing amount of activator per unit time corresponded to the previously determined activity curve of the reaction mixture.

| Activator added (g) per 140 g Component A | Cream Time (seconds) | Friability Time (seconds) |
|---|---|---|
| 0 | 18–22 | 100 |
| 0.025 | 15–20 | 94 |
| 0.050 | 13–16 | 88 |
| 0.075 | 12–15 | 83 |
| 0.100 | 9–14 | 78 |
| 0.125 | 8–12 | 74 |
| 0.150 | 7–11 | 69 |
| 0.175 | 7–10 | 65 |

In view of this activity information, the delivery rate of the additional activator pump was set as follows:

| Time | Delivery Rate |
|---|---|
| after 0 seconds | 0 g/second |
| after 5 seconds | 0.0188 g/second |
| after 10 seconds | 0.0400 g/second |
| after 15 seconds | 0.0625 g/second |
| after 20 seconds | 0.0875 g/second |
| after 25 seconds | 0.1125 g/second |
| after 30 seconds | 0.140 g/second |

| Reaction data of the reaction mixture | | | | |
|---|---|---|---|---|
| Injection Time (secs) | 1 | 10 | 20 | 30 |
| Activator delivery, g/140 g Component A | 0 | 0.04 | 0.095 | 0.145 |
| Cream Time (secs) | 18–22 | 15–18 | 12–15 | 7–11 |
| Friability Time (secs) | 100 | 90 | 80 | 70 |
| Gross Density (kg/m³) | 23 | 23 | 23 | 22.5 |

The gross density distribution in the composite units of dimensions 6×1×0.05 m produced by the lance-drawing technology was as follows:

Start of panel: 40 to 45 kg/m³ (beginning of shot)

Middle of panel: 40 to 45 kg/m³

End of panel: 40 to 45 kg/m$^3$ (end of shot)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane foam having isocyanurate groups present therein in a mold comprising:
   a) combining a polyisocyanate, a compound containing at least two hydrogen atoms which are reactive with isocyanate groups, water, a blowing agent and activator in a mixing chamber to produce a foam-forming mixture,
   b) feeding the foam-forming mixture of a) into the mold,
   c) adding activator to the foam-forming mixture of a) or to one of the components of the foam-forming mixture prior to b) in a manner such that the amount of activator present in portions of the mixture is increased as the mold is filled to the extent necessary to achieve a simultaneous friability time for the mixture in the mold,
   d) allowing the foam-forming mixture to rise, and
   e) removing the foam formed in d) from the mold.

2. The process of claim 1 in which the foam-forming mixture produced in a) also includes a foam stabilizer and/or flameproofing agent.

3. The process of claim 1 in which the foam-forming mixture is produced in a one-shot process.

4. The process of claim 1 in which the foam-forming mixture is produced in more than one shot.

5. The process of claim 4 in which the relative amount of activator is increased from shot to shot.

6. The process of claim 5 in which the increase in amount of activator is proportionately greater in one shot than the increase in the other shots.

7. The process of claim 4 in which the amount of activator added in c) is controlled by means of a computer.

8. The process of claim 1 in which the amount of activator added in c) is controlled by means of a computer.

9. The process of claim 1 in which the polyisocyanate is a polymeric diphenylmethane diisocyanate having a monomer content of from 25 to 70% by weight.

10. The process of claim 1 in which the polyisocyanate is a polyurethane-modified polymeric diaminodiphenylmethane having a monomeric diphenylmethane diisocyanate content of from 35 to 70% by weight.

11. The process of claim 1 in which the activator is a compound which strongly accelerates the reaction of hydroxyl groups with polymeric diphenylmethane diisocyanate.

12. The process of claim 1 in which the activator is a compound which strongly accelerates the reaction of hydroxyl groups with a polyurethane-modified polymeric diaminodiphenylmethane.

* * * * *